April 2, 1929.  C. OMAN  1,707,278
ELECTRICAL MEASURING INSTRUMENT
Filed Oct. 28, 1926
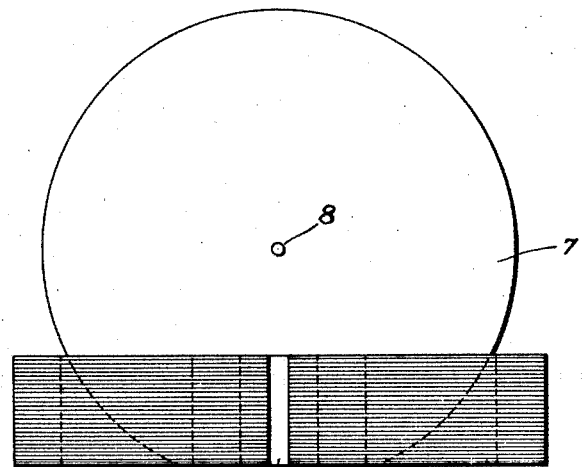
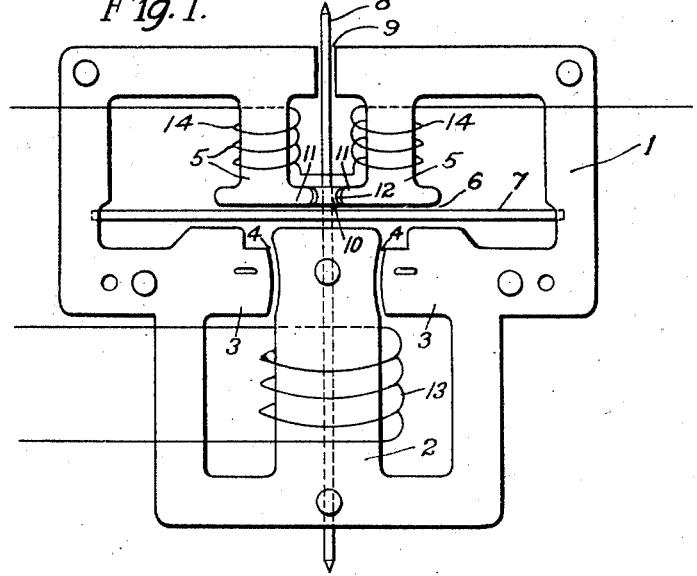
WITNESSES:
C. J. Weller.
B. R. King
INVENTOR
Carl Oman.
BY
Wesley F. Carr
ATTORNEY Patented Apr. 2, 1929.

1,707,278

UNITED STATES PATENT OFFICE.

CARL OMAN, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed October 28, 1926. Serial No. 144,774.

My invention relates to electrical measuring instruments and particularly to motor meters.

An object of my invention is to provide means for adapting a motor meter to operate correctly through a wide range of load.

Another object of my invention is to provide the magnetic circuit of a motor meter with means for deflecting a relative part of its magnetic flux through its armature under predetermined conditions.

A further object of my invention is to provide an improvement in a meter of the character described in U. S. Letters Patent No. 1,290,492 issued to Clarence A. Boddie, January 7, 1919.

A still further object of my invention is to provide in a motor meter of the above-indicated character a mechanically strong magnetic structure.

Heretofore performances of watthour meters of the induction type have not always been found satisfactory, because the percentage registration curves taken thereon for various loads did not approach a straight line representation of the correct measurement. In such instruments, the registration was incorrect when the load varied, because the damping action in a motor meter of the induction type varies as the square of the magnetic flux, while the torque varies directly as the magnetic flux.

In the Boddie patent mentioned above, means for deflecting a relatively large part of the magnetic flux induced by the current winding through the armature when predetermined loads are impressed thereon are provided in order to increase the torque of the armature and thus overcome the damping effect upon the armature at relatively great loads.

In the mechanical structure of the magnetic core shown in that patent, the series poles are separated from the main core by air gaps. In a well known manner these air gaps cooperate with projections on the series poles to cause the torque flux to increase at such a rate as to compensate for the retardation errors arising from the series damping flux.

Separating the series poles from the main core in the manner shown has the effect of considerably weakening the entire magnetic structure. The length of the air gaps between the series poles and the main core must be accurately adjusted to insure the proper magnetic characteristics in the current element. Unless extreme care is taken in assembly, inaccuracies are introduced by the series poles slipping and thus increasing or decreasing the length of the air gaps between them and the main core.

In order to obtain the result taught by Boddie but with a stronger and less expensive core structure I dispose an air gap in the core assembly between the series poles. An air gap of fixed and accurate length being thereby made possible by virtue of the rigid and substantial nature of the resulting core structure.

Figure 1 of the accompanying drawings is a diagrammatic view of a motor meter embodying my invention.

Fig. 2 is a top plan view of the meter shown in Fig. 1.

A laminated magnetizable core member 1 of a motor meter is provided with a central member 2, two side members 3 that are spaced from the central member 2 by air gaps 4, and members 5 that are spaced from the central member 2 and the side members 3 by an air gap 6 in which an armature 7 is disposed that is mounted on a shaft 8. An air gap 9 is provided in the core member 1 between the pole pieces 5. A magnetizable insert 10 is disposed between the projections 11 on the pole pieces 5 and is magnetically insulated therefrom by brass or other non-magnetizable spacers 12. A winding 13 is disposed around the central member 3, and series windings 14 are disposed around the members 5.

The windings 13 and 14 produce fluxes that cooperate with the armature to cause the same to develop a torque that is proportional to the product of the current and voltage traversing the windings. This torque varies directly as the change in magnetic flux. However, since the flux set up by the windings also tends to retard the armature 7, the speed of the armature is not directly proportional to the product of the current and voltage, but varies somewhat from this direct ratio. Such variation is caused by the damping action of the windings 13 and 14 which is proportional to the square of the change of flux.

The magnetizable insert 10 assists in the attaining of a proper registration curve because at normal loads, the flux from the pole pieces 5 divides between the member 10 and the air gap 6. When the load increases, the member 10 becomes magnetically saturated and causes a relatively greater portion of the flux to traverse the air gap 6, and thus increases the torque of the armature to compensate for the increased retardation at high loads. This action with the decreased damping action incident to re-distribution of the flux in the core structure by reason of the magnetic resistance of the air gap 9 greatly improves the performance of the meter.

The effect of the air gap 9 is equivalent to that of two air gaps between the member 1 and the members 5, but the entire structure is much stronger mechanically with the members 5 integral with the member 1. The air gap 9 in the main core 1 maintains its fixed length whereas two air gaps between the member 1 and the members 5 are subject to variation in length after assembly when the meter is in operation.

My invention is not limited to the specific structure illustrated, as it may be variously modified without departing from the spirit and scope of the invention, as set forth in the appended claims.

I claim as my invention:

1. An electrical measuring instrument comprising a magnetizable core having a central upwardly projecting member, side members separated from the central member by air gaps, downwardly projecting members, said core having an air gap therein between said downwardly projecting members, and a separate magnetizable shunt member disposed across the ends of said downwardly projecting members.

2. An electrical measuring instrument comprising a magnetizable core having a magnetic circuit outer portion with an air gap therein, a central inwardly projecting portion, inwardly projecting side portions separated from the central portion by air gaps, and inwardly projecting members separated from the central and side portions by air gaps.

3. A motor meter comprising a core member of substantially rectangular shape having two downwardly extending pole pieces, and upwardly and inwardly extending pole pieces separated from the downwardly extending pole pieces by an air gap, said core member having an air gap therein in its periphery between the two downwardly extending pole pieces.

4. A meter comprising a magnetizable core of substantially the form of a hollow rectangle, and inwardly extending current and voltage pole pieces thereon, said core having an air gap therein in its periphery between the current pole pieces for improving the load characteristic of said meter.

5. A meter comprising a magnetizable core member of substantially the form of a hollow rectangle and inwardly extending current and voltage pole pieces thereon, said core having an air gap in one of the sides of said rectangle for improving the load characteristic of said meter.

6. In a watthour meter, the combination with a magnetizable core member of substantially the form of a hollow rectangle having an inwardly-extending central portion and two inwardly-extending portions separated from said central portion by air gaps, of means for improving the load characteristic of said meter including a magnetizable shunt disposed between the ends of said two portions, and the portion of said core member between said two portions having an air gap therein.

7. A meter comprising a magnetizable core having cooperating current and voltage pole pieces, said core having an air gap in its periphery between the current pole pieces for improving the operation of the meter.

In testimony whereof, I have hereunto subscribed my name this 26th day of October 1926.

CARL OMAN.